(12) United States Patent
Tapp

(10) Patent No.: US 8,025,156 B2
(45) Date of Patent: Sep. 27, 2011

(54) METHOD AND APPARATUS FOR SEPARATING AND DEWATERING SLURRIES

(76) Inventor: Floyd G. Tapp, Philpot, KY (US)

( * ) Notice: Subject to any disclaimer, the term of this patent is extended or adjusted under 35 U.S.C. 154(b) by 0 days.

(21) Appl. No.: 12/802,837

(22) Filed: Jun. 14, 2010

(65) Prior Publication Data

US 2010/0314304 A1 Dec. 16, 2010

Related U.S. Application Data

(60) Provisional application No. 61/268,763, filed on Jun. 16, 2009.

(51) Int. Cl.
| | |
|---|---|
| B30B 9/12 | (2006.01) |
| B30B 9/18 | (2006.01) |
| B01D 29/23 | (2006.01) |
| B01D 29/25 | (2006.01) |
| B01D 29/64 | (2006.01) |
| B01D 33/073 | (2006.01) |
| B01D 33/66 | (2006.01) |

(52) U.S. Cl. ............ 210/414; 210/415; 210/323.2; 210/332; 210/346; 210/360.2; 210/374; 210/378; 210/396; 210/397; 210/398; 210/402; 100/117; 100/145

(58) Field of Classification Search .............. 210/323.2, 210/32, 346, 360.2, 374, 378, 396, 397, 398, 210/402, 414, 415; 100/117, 145
See application file for complete search history.

(56) References Cited

U.S. PATENT DOCUMENTS

| | | | | |
|---|---|---|---|---|
| 1,348,159 | A * | 8/1920 | Down | 210/771 |
| 1,354,528 | A * | 10/1920 | Wertenbruch | 100/74 |
| 2,664,814 | A * | 1/1954 | Ahlborn | 100/117 |
| 3,126,818 | A * | 3/1964 | Koelsch | 100/112 |
| 3,478,679 | A * | 11/1969 | Bauserman | 100/117 |
| 3,966,607 | A * | 6/1976 | Gaynor et al. | 210/137 |
| 4,901,636 | A * | 2/1990 | Tegtmeyer et al. | 100/117 |
| 5,472,622 | A * | 12/1995 | Solomon et al. | 210/767 |
| 5,653,879 | A * | 8/1997 | Schroeder | 210/298 |

* cited by examiner

Primary Examiner — Thomas M Lithgow
(74) Attorney, Agent, or Firm — Gary K. Price

(57) ABSTRACT

A vertical cylindrical dewatering apparatus for dewatering fibrous slurries, slurry of manure and water, or other similar slurries. The apparatus includes a housing that includes a defined chamber having an enclosed top end with a slurry injector into the chamber, a centrally disposed first filtering element that includes first and second flightings, and a second vertical cylindrical filtering element including a support grid. The first and second filtering elements define the chamber. The slurry in-flow port at the top of the apparatus directs the slurry spiraling down between the flightings. The particles start building up at the bottom of the chamber as the water is filtered out from the housing through filtrate drains. Compressed air supplied through a rotating seal down through the centrally disposed filtering element moves through the filter, and through the particles forcing the water from between the particles out through the outer filter element. After the moisture is removed from the particles, a hinge door is opened and a drive motor turns the first filter and flightings for particle removal. An alignment ring is attached to outer edges of the lower end of said flights in order to maintain a clearance of at least ¼ inch between the outer edges and the second filter element.

19 Claims, 7 Drawing Sheets

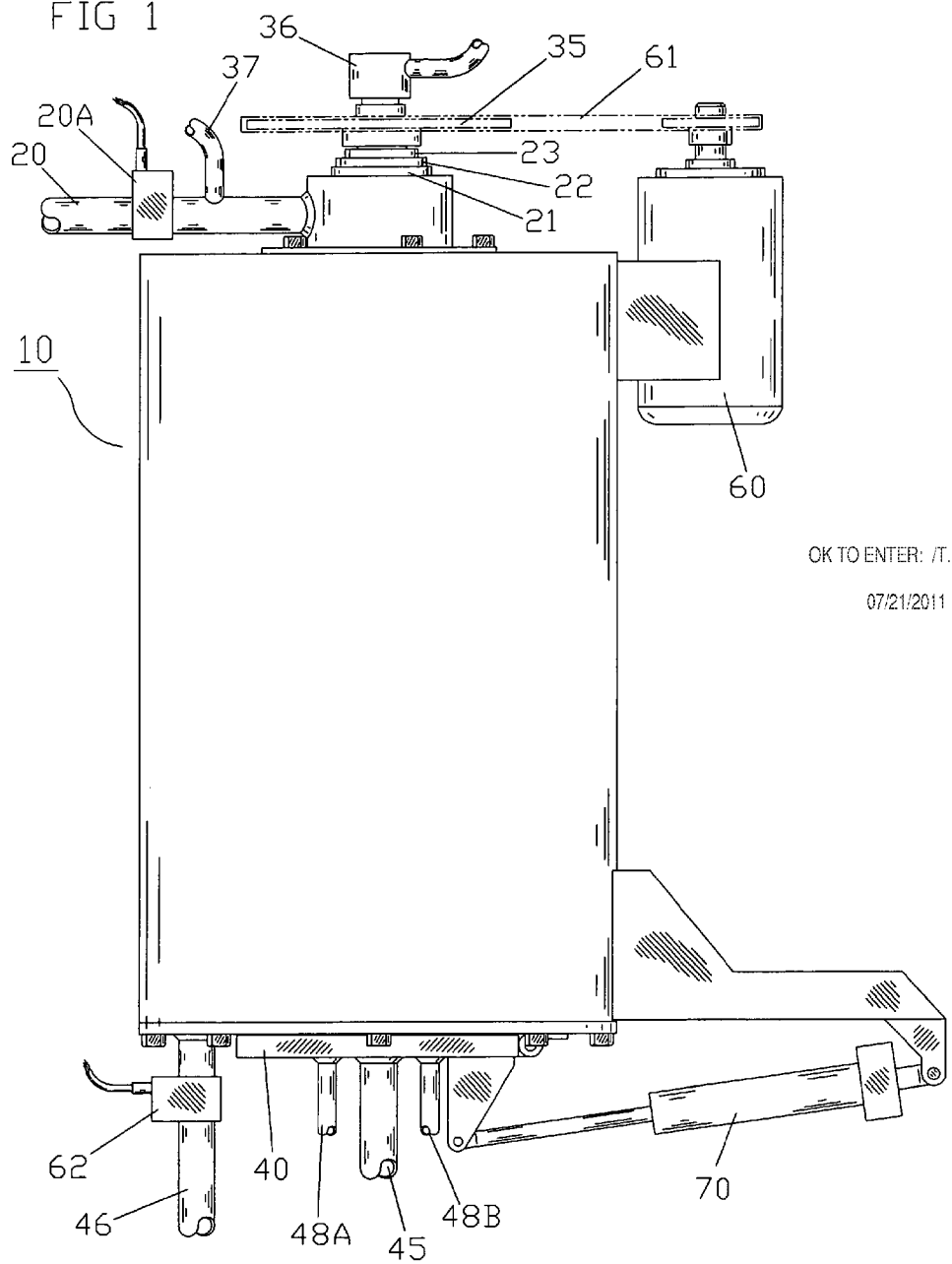

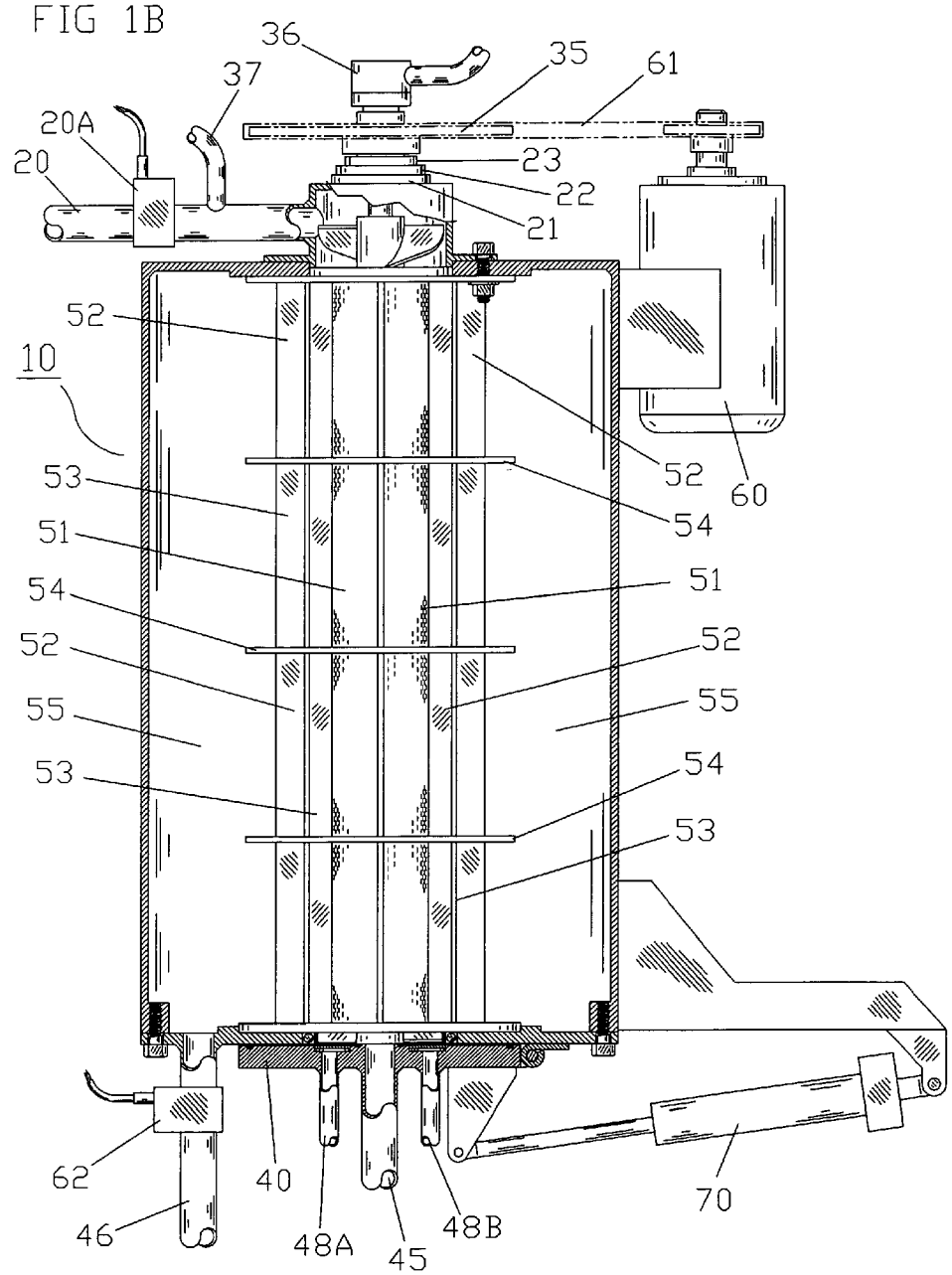

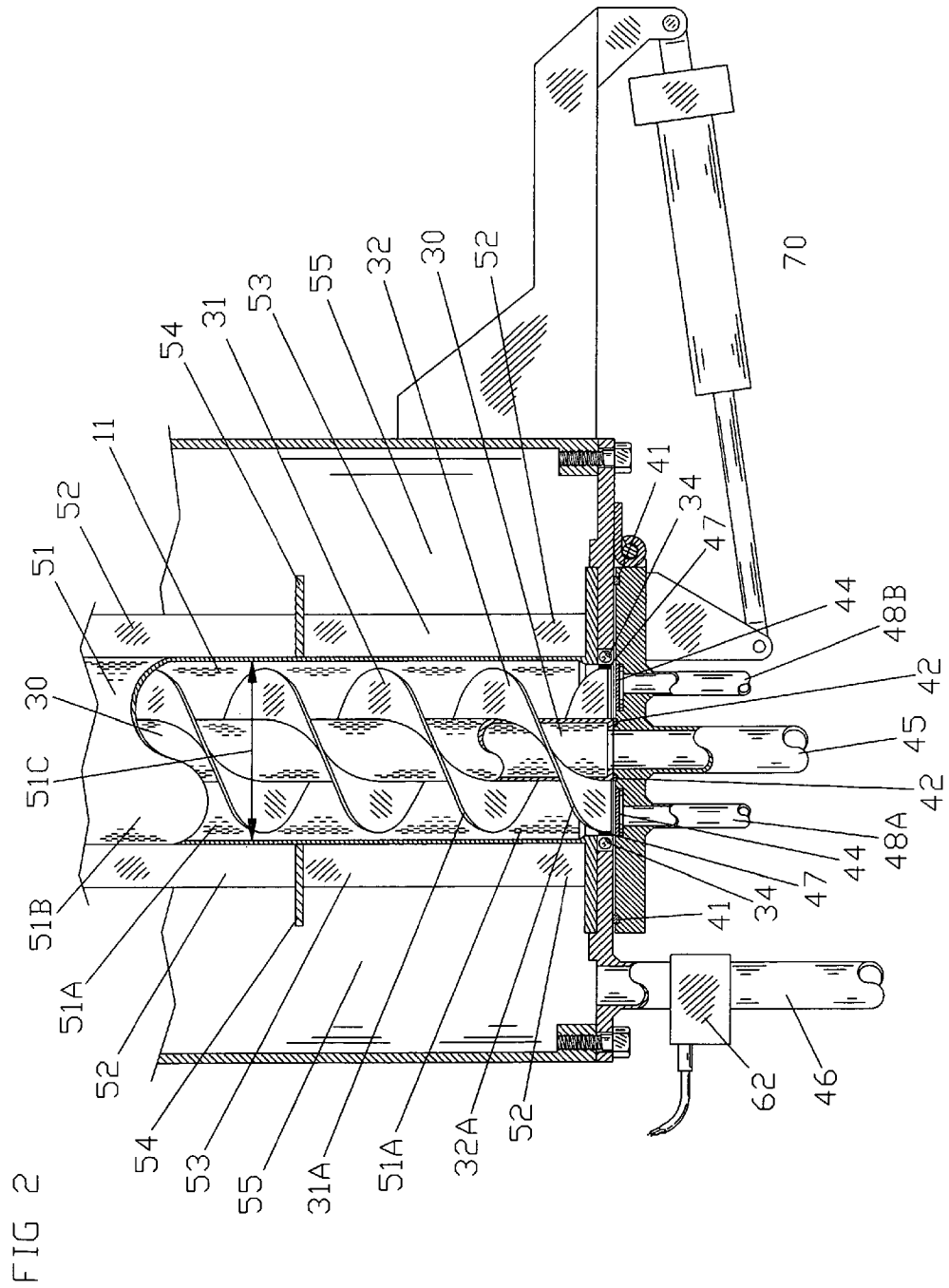

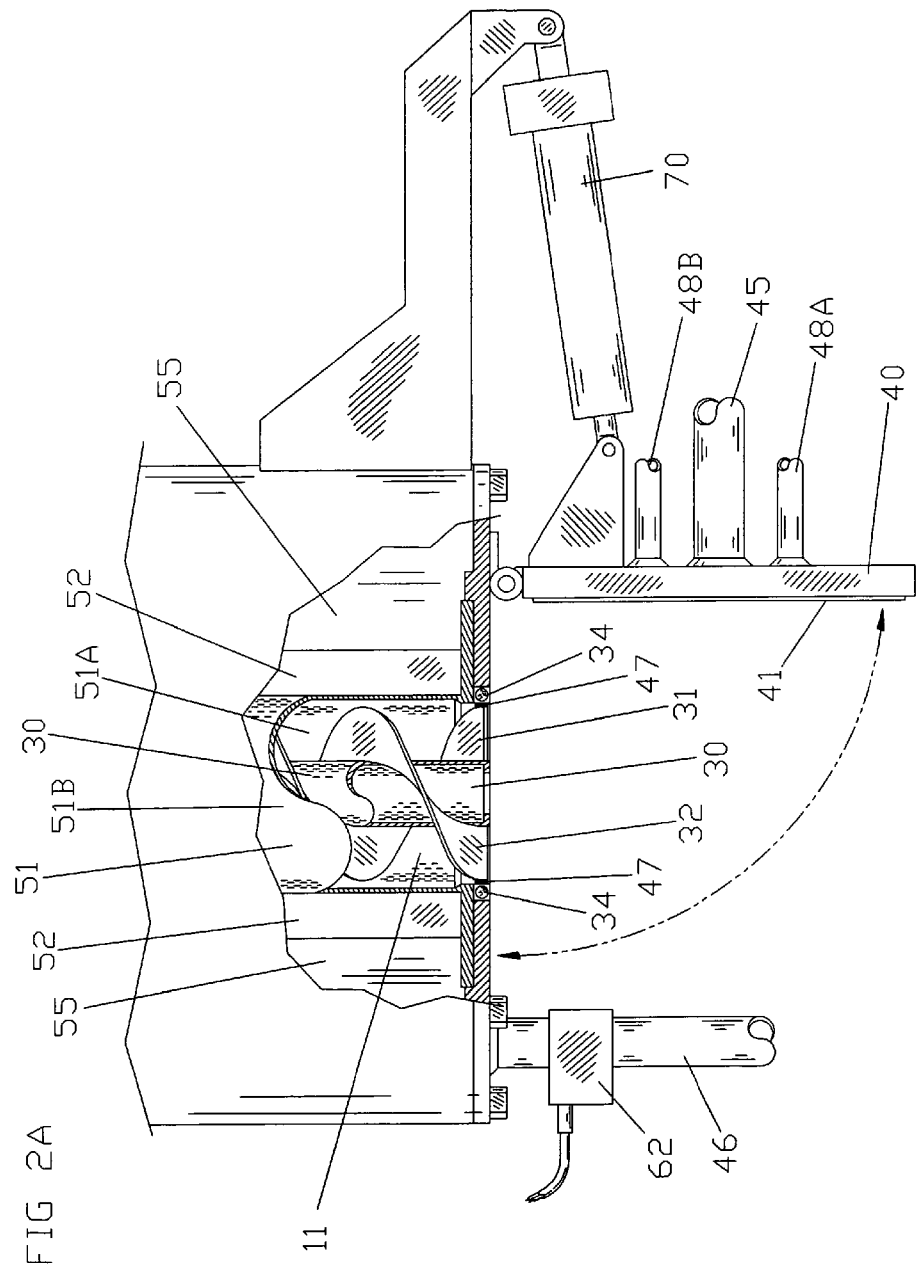

METHOD AND APPARATUS FOR SEPARATING AND DEWATERING SLURRIES

CROSS REFERENCES TO RELATED APPLICATIONS

U.S. Provisional Application for Patent No. 61/268,763, filed Jun. 16, 2009, with title "Method and Apparatus for Separating and Dewatering Slurries" which is hereby incorporated by reference. Applicant claims priority pursuant to 35 U.S.C. Par. 119(e)(i).

STATEMENT AS TO RIGHTS TO INVENTIONS MADE UNDER FEDERALLY SPONSORED RESEARCH AND DEVELOPMENT

Not Applicable

BACKGROUND OF THE INVENTION

1. Field of the Invention

This invention relates to a new method for separating the particles from a slurry and dewatering them using air to remove the moisture from between the particles. This new vertical concept prevents the filter cake from becoming the main filtering element and allows the air to reduce the moisture level to previously unachievable levels.

2. Brief Description of Prior Art

Solid-liquid separation is one of the most worked arts in history. Never before has the need for a cost-effective mechanical dewatering process been so great. Our ground water is being destroyed at a frightening rate by the concentrated animal feed operations (CAFO's). CAFO's produce over 375 million tons of manure per year. Large dairy and swine operations are major contributors. The lack of efficient dairy and swine manure management equipment has made The Clean Water Act of 2002 unenforceable. Prior art dewatering systems are not effective because they attempt to press the moisture from the particles and the end result is a compacted mass of wet fiber with little porosity. Others build the cake filtered particles on the filter belt and the filter cake becomes the primary filtering element. The clingosity of the shredded particles tends to grab the smaller undigested gelatinous particles as they pass through the cake reducing the porosity. As the cake builds, the back pressure of the filter cake requires more pressure to move the water through the filter cake. More pressure results in less porosity and blinding is inevitable. Without the ability to move the filtrate through the cake the throughput is limited.

In the past, dairy and swine farmers had no logical choice but to send the nutrient loaded slurry to the manure lagoons.

Not only are we losing our groundwater, an alarming amount of methane, which is 21 more times dangerous than CO2, is being released into our atmosphere. Methane stays in the upper atmosphere trapping heat for 9 to 15 years. We should be capturing the methane for renewable energy and at the same time, reduce the phosphorous poisoning of our groundwater. The electrical energy available in a dairy cow's daily manure will burn a 150 watt light bulb for 24 hours. By using anaerobic digesters to generate biogas to produce energy and by composting the larger fibers as will be described, dairy and swine farmers can turn their expensive manure management problem into something of value.

These things can't be done cost-effectively without an efficient solid-liquid separation (SLS) concept. Every environmentally friendly and efficient dairy and swine manure management flow chart has SLS as one of the required steps.

Several SLS methods and apparatuses have been used to separate and dewater the particles in dairy or swine manure. They generally fall under the categories of centrifuges, hydrocyclones, belt presses, screw presses, diaphragm presses, horizontal filter chambers, rotary disc with vacuum, horizontal belt with vacuum, etc. They all have one or more of the following problems: expensive, unreliable, low throughput, reduced porosity, filter cake blinding, and they fail to meet acceptable moisture levels.

As will be seen from the subsequent description, the preferred embodiments of the present invention overcome the shortcomings of the prior art.

SUMMARY OF THE INVENTION

The principal objective of the present invention is to give the dairy and swine farmers an efficient solid-liquid separating and dewatering machine to help them turn an enormous environmental problem into something of value. With more throughputs for less cost while reducing the moisture level to the required percentage, the farmers now have a choice. They can generate biogas capturing the methane that would be released into the atmosphere and compost the larger dried solids. Since peat has become scarce, the horticulturalist can use composted manure as a substitute. With this invention, the farmers can reduce the nutrient loading of the lagoons, the leeching of phosphorous into our ground water, and the releasing of methane into the atmosphere.

This invention is designed to maintain the porosity of the particles so the blown air can displace the moisture from between the particles. If the porosity is not maintained the filter cakes blind. The vertical cylindrical apparatus of the present invention has an enclosed top end with an inlet port for slurry injection. An inner screen that is preferably a perforated shaft and an outer cylindrical screen define a chamber, with two flights attached to the inner screen. Slurry is pumped through the inlet port spiraling down between flights within the chamber. The inner and outer cylindrical screens filter the slurry until the chamber is full of particles. A door at the bottom of the chamber is actuated for opening and closing. The door includes a screen covered area with drains. Gravity will drain filtrate from the chamber either through the outer screen or down through the screen in the door.

For the drying phase a valve in the drain line in the center of the door is closed. Blown air is supplied through a rotating valve and down through the inner, perforated shaft. The air goes out through the particles and carries the moisture from between the particles out through the outer cylindrical screen. Air also goes down through the screen in the door which dries the particles in the bottom of the chamber. The two flights are used to remove the dried particles from the chamber.

The length of time required to dry the particles to a specific moisture level varies and is adjustable for different slurries. The thickness of the particle cake may need to be reduced and this can be done by changing the diameter of the inside cylinder and using narrower flights.

With this technology, dairy farmers can turn an enormous liability and severe environmental problem into a product of value: fertilizer, compost, litter, mulch, biogas (methane), solid fuel, etc. Not only are they preventing the destroying of our ground water, they can reuse the effluent water many times before it needs to go to the settling lagoon. The expense of frequent cleaning of the nutrient loaded lagoons is greatly reduced.

In the generation of biogas in fixed-film digesters the larger particles need to be removed from the slurry before it enters the digester. In plug-fed digesters the slurry with all the particles is fed directly into the digester but the solids have to be processed after the slurry leaves the digester. In both cases methane is generated and the solids can be composted.

Another energy application for this invention is the dewatering of coal fines. Research has shown that fiber is needed to cost-effectively dewater coal fines. The fiber from the undigested feed for dairy cattle, concentrated animal feeding operations, horse farms, etc. can be combined with the coal fines to produce an energy source that can be burned in pulverized coal furnaces at a ratio of 1:10 to generate electricity.

As will be seen from the subsequent description, the preferred embodiments of the present invention overcomes the objections to the prior art and meet the requirements of being simple, dependable, and economical to manufacture.

BRIEF DESCRIPTION OF THE DRAWINGS

FIG. 1 is a front perspective view of the preferred embodiments of the present invention, an apparatus for separating and dewatering slurries.

FIG. 1B is a front view of the apparatus of FIG. 1.

FIG. 2 is a partial view of the apparatus of FIG. 1.

FIG. 2A is a partial view of the apparatus of FIG. 2 with the door in an open position.

DESCRIPTION OF THE PREFERRED EMBODIMENT

In accordance with the present invention, a vertical fiber and solids separation and dewatering system is disclosed. The vertical dewatering apparatus system uses compressed air to displace the moisture from between the particles with minimum compressing of the particles. The compressed air is supplied through an inner screen that is preferably a perforated shaft used to drive flightings to remove the dried cakes. In the broadest context, the apparatus of the present invention consists of components configured and correlated with respect to each other so as to attain the desired objective.

Figure 1A:
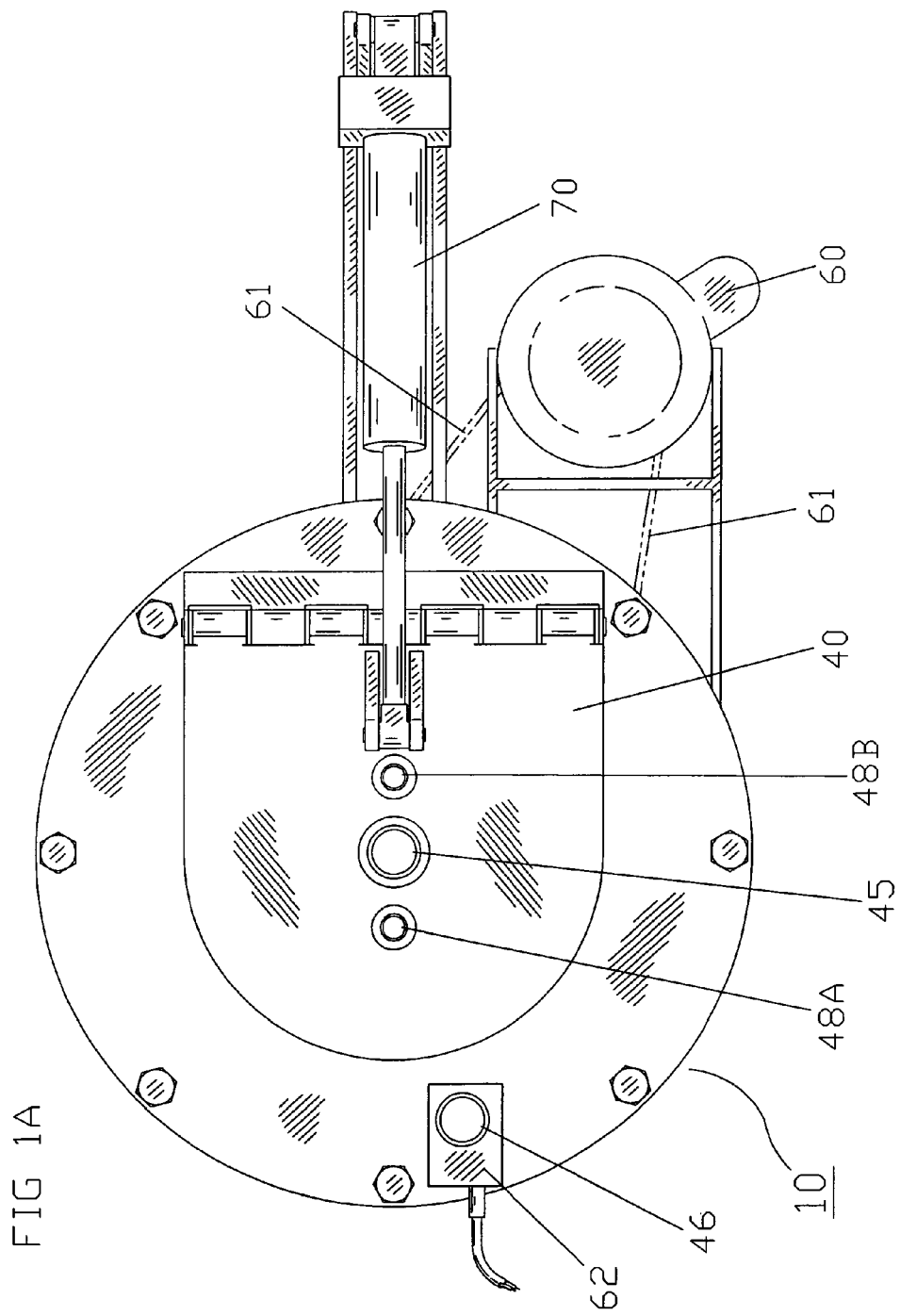
FIG. 1A is a bottom view of the apparatus of FIG. 1.
Figure 2B:
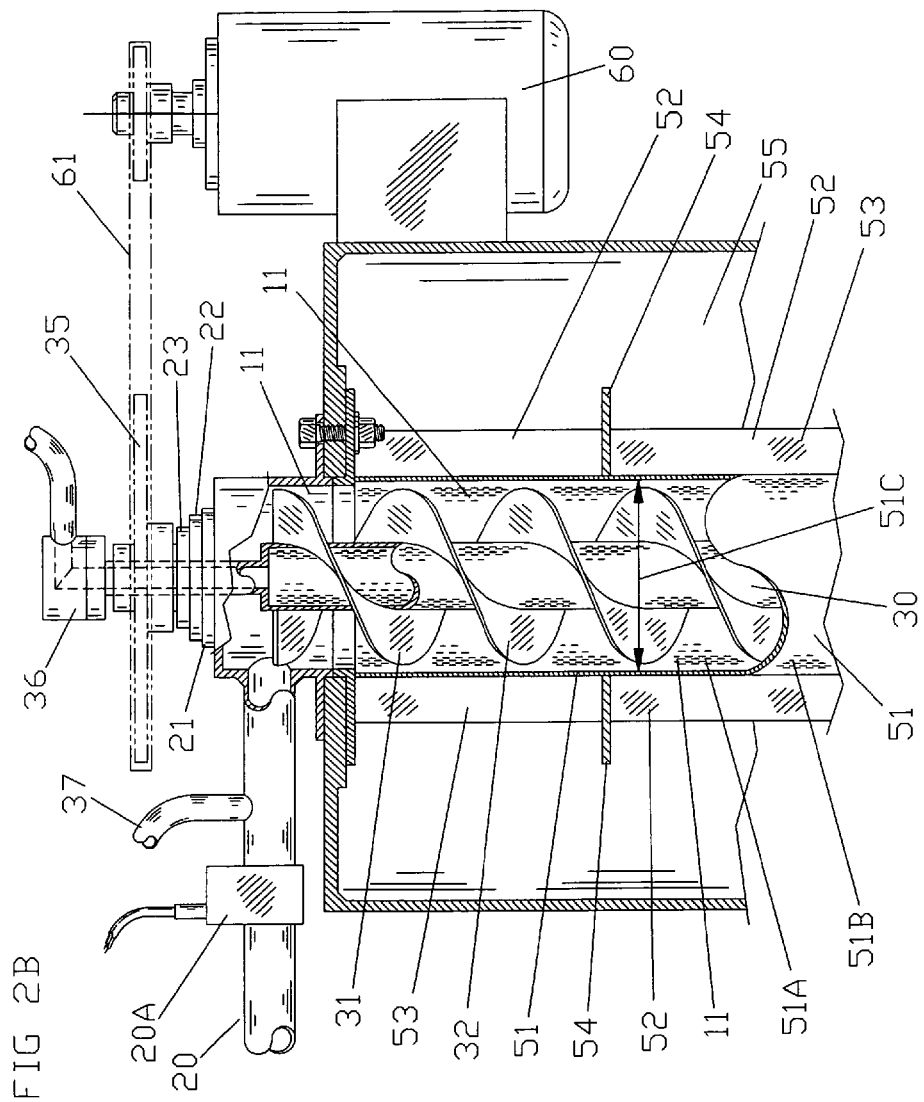
FIG. 2B is a partial view of the apparatus of FIG. 1.

FIGS. 1-2 illustrate the preferred embodiment of the separating and dewatering system. As best shown in FIG. 1, a vertical dewatering apparatus 10 includes a slurry and inlet port 20 and a bottom hinged door 40 with seals 41 and 42. The door 40 includes a filter screen 44 and a center drain 45 and drains 48A, 48B.

The apparatus 10 has a centrally disposed perforated shaft 30, the perforated shaft 30 defining a first filtering element of the present invention. As will be understood, center drain 45 drains filtrate from the first filtering element 30.

The apparatus 10 further includes an outer cylindrical screen 51 with a support grid 52. The grid 52 has a number of vertical supports 53 with support rings 54. The cylindrical screen 51 has an interior 51A and exterior 51B. The outer cylindrical screen 51 defining a second filtering element of the present invention.

An inner diameter, designated as 51C in FIG. 1, of the cylindrical second filtering element 51, with the first filtering element 30 define a chamber 11 within the apparatus 10. In application, a prior art slurry pump (not shown) pumps slurry through the inlet port 20 and directly into the chamber 11 for processing. As will be further described, the perforated shaft 30 is in fluid communication with the filtrate drain 45.

Flightings 31 and 32 are attached to the center shaft 30 at the top and bottom of the shaft 30. The flightings 31 and 32 are further attached to a floating alignment bearing ring 34. The alignment bearing 34 keeps the shaft 30 and flightings 31 and 32 aligned and maintains a proper clearance between outer edges 31A, 32A of the flightings 31 and 32 respectively, and the interior 51A of the cylindrical filter 51.

The bearing ring 34 is attached to the flightings 31, 32 at the lower portion of the chamber 11, adjacent the door 40. As illustrated, the bearing ring 34 is attached to the flightings 31, 32 at points 47. In the preferred embodiment, a proper clearance is maintained between the flight 31, 32 and the filter 51. Preferably the proper clearance is approximately ¼ inch. The inventor has found that when the proper clearance is not maintained and the flights are too close to the filter 51, the fiber is pushed into the filter 51, placing more pressure on the filter and causing the fiber to cling to the filter itself.

The top of the shaft 30 is supported by a seal 21, a bearing 22, and a collar 23. Preferably, a rotating seal 36 feeds air to the shaft 30. Preferably, a drive motor 60 and belt 61 turns member 35 of the perforated shaft 30 for, as will be described, dried particle removal.

The apparatus 10 further includes a drain 46 disposed approximately adjacent the exterior 51B of the filter element 51 and therefore in an area 55 that is outside the defined chamber 11. As will be described, filtrate is removed from the chamber 11 through drains 45, 48A, 48B, and is removed from the area 55 outside the chamber 11 through drain 46.

Once the slurry and inlet port fills the chamber 11 with fiber and particles (not shown), and the flow out 46 slows, a flow sensor 62 closes a valve 20A to the slurry inlet port 20, and air injected through air inlet 37 blows the moisture from the solids in the upper portion of the chamber 11 while air further injected through the rotary valve 36 to blow the moisture radially through the perforated shaft 30, and through the solids, and out through the filter 51. As previously discussed, moisture drained from within the chamber 11 is directed to drains 45, 48A, 48B, and moisture blown through outer filter 51 into area 55 is drained through drain 46.

After the moisture is sufficiently reduced, the air supply valves 36, 37 are closed; actuator 70 then opens door 40, and drive motor 60 turns shaft 30 with flightings 31 and 32 for solids removal from the chamber 11.

As described the flightings are for dried solids removal only and not for compressing the moisture from the cake of solids. The vertical design greatly reduces the chance of filter cake blinding because the solids never become the main filtering element. The first and second filtering elements keep allowing the filtrate to flow from the chamber until the solids fill the chamber up past the filtering elements. At this point the flow from the chamber slows and a flow sensor 62 turns off the slurry pump. The clingosity of fibrous slurries such as dairy manure normally presents a problem for cake removal for many solid-liquid separation apparatuses. This invention uses the clingosity to its advantage. As described, the proper clearance between the outer edges of the flightings and the cylindrical filter element minimizes filter element cleaning. The right clearance flakes the accumulated solids cleanly from the filter element. The compressed air easily blows the filtered and dried solids from the first filtering element 30 and from between the flightings.

Figure 3:
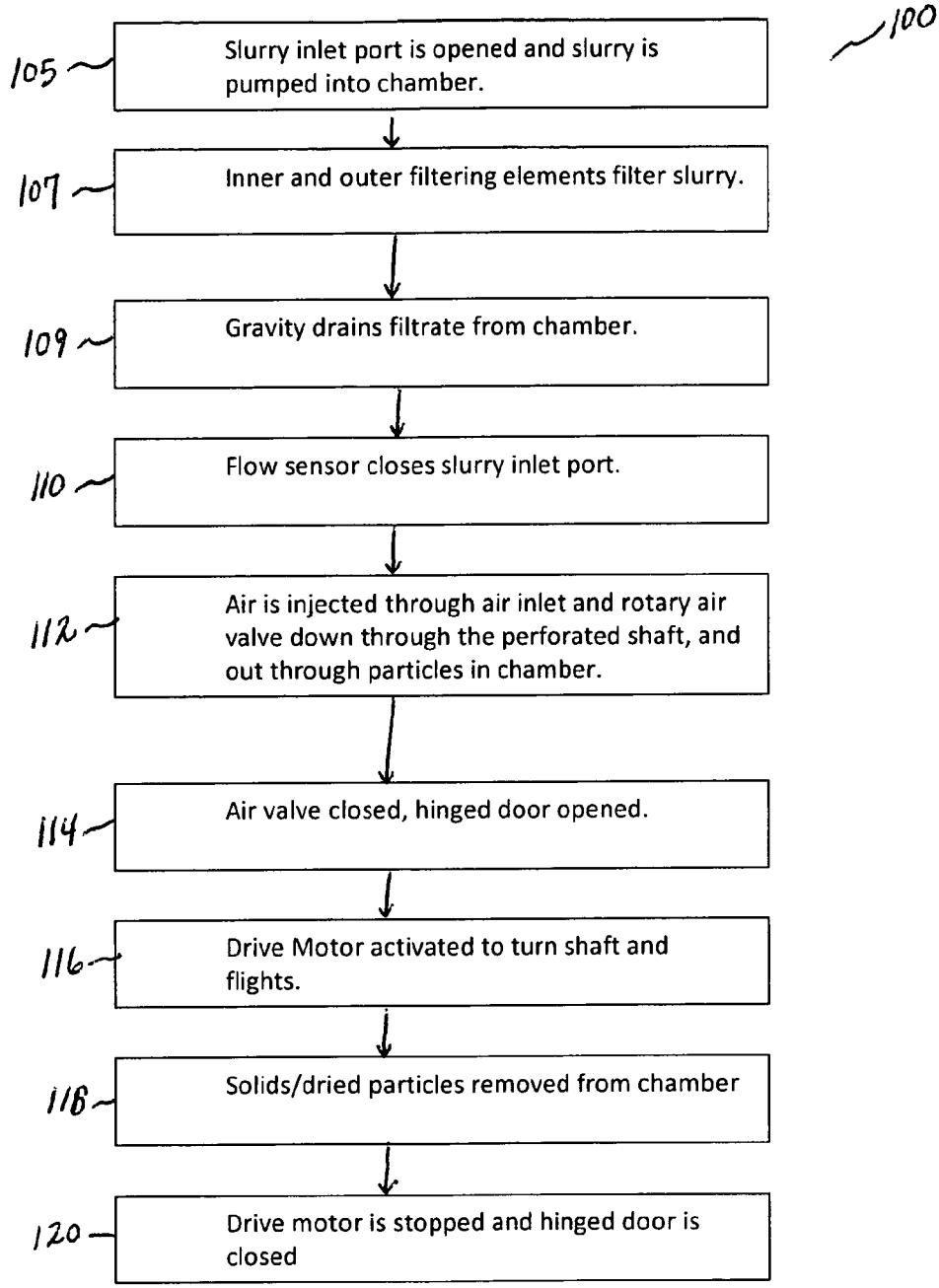
FIG. 3 is a flow sheet showing the process steps of the present invention.

Referring to FIG. 3, the method 100 of separating and dewatering slurries is shown. At step 105, the slurry inlet port 20 is opened and slurry is pumped into the chamber 11. As the slurry enters the chamber 11, slurry spiral downs between the flights 31, 32 within the chamber 11. At step 107, the filtering elements 30, 51 filter the slurry as it enters the chamber 11.

Gravity will drain 109 filtrate from the chamber 11 either through the outer filtering element 51 and down through the filtrate drain 46 or down through the perforated shaft 30 and down through the center filtrate drain 45.

As the chamber 11 fills with particles, the filtrate flow leaving the chamber 11 slows. At step 110 the flow sensor 62 closes valve 20A to the slurry inlet port 20.

Air is injected 112 through air inlet 37 into the upper portion of the chamber 11 and through the rotary air valve 36 into the perforated shaft 30 where air is directed through the particles in the chamber 11 and carries the moisture out through the outer filter element After the particles are dried, at step 114 the air valve 36 is closed and the door 40 is opened. Drive motor 60 is activated 116 to turn the shaft 30 and flights 31, 32 for solids removal 118 from the chamber 11. The two flights 31, 32 remove the dried particles from the chamber 11.

Once the solids are removed, at step 120 the shaft motor 60 is stopped, the door 40 closed to begin the next cycle.

Although the description above contains many specificities, these should not be construed as limiting the scope of the invention but as merely providing illustrations of some of the presently preferred embodiments of this invention. Thus the scope of the invention should be determined by the appended claims in the formal application and their legal equivalents, rather than by the examples given.

I claim:

1. A vertical cylindrical apparatus for solid-liquid separation using compressed air as the force for dewatering, said apparatus comprising:
    a housing having an interior and an enclosed top end with a port for slurry injection into a chamber in said housing,
    inner and outer screens that define said chamber, wherein said inner screen is centrally disposed in said chamber and includes first and second flights that extend a vertical length of said inner screen,
    a hinged door disposed at a bottom end of said housing, said hinged door having an open position and a closed position,
    a screen covered area with a first filtrate drain adjacent said hinged door,
    wherein said inner screen is in fluid communication with said first filtrate drain,
    a ring attached to an outer edge of said first and second flights,
    wherein said ring maintains a proper clearance between said outer edges and said outer screen,
    a first air valve in fluid communication with said inner screen,
    a drive motor for turning said inner screen and said first and second flights within said housing.

2. The apparatus as recited in claim 1, wherein said proper clearance is approximately ¼ inch.

3. The apparatus as recited in claim 1, wherein said proper clearance is greater than ¼ inch.

4. The apparatus as recited in claim 1, wherein said outer screen includes a support grid, said support grid having a plurality of vertical supports with support rings.

5. The apparatus as recited in claim 4, wherein said housing includes means to support a top end of said inner screen.

6. The apparatus as recited in claim 1, further including a second air valve in fluid communication with said chamber.

7. The apparatus as recited in claim 1, wherein said first air valve is a rotating air valve.

8. The apparatus as recited in claim 1, wherein said interior of said housing includes a second drain in fluid communication with an area outside said chamber.

9. The apparatus as recited in claim 1, wherein said ring is disposed at a lower end of said flights adjacent to said hinged door.

10. A vertical cylindrical apparatus comprising:
    a housing having an enclosed top with an input for slurry injection into a chamber,
    a hinged door,
    a first filtering element,
    a second filtering element having a cylindrical configuration and an inner diameter that defines a chamber,
    wherein said first filtering element is centrally disposed in said chamber,
    wherein said second filtering element includes a support grid,
    wherein said first filtering element is in fluid communication with a first drain, first and second flights attached to said first filtering element, wherein a lower end of said flights are adjacent said hinged door,
    a ring attached to an outer edge of said lower end of said flights,
    wherein said ring maintains a clearance of at last ¼ inch between said outer edge and said second filtering element,
    a first air valve in fluid communication with said first filtering element,
    a second air valve in fluid communication with said chamber,
    means for turning said first filtering element and said first and second flights within said chamber.

11. The apparatus as recited in claim 10, wherein said housing includes means to support a top end of said first filtering element.

12. The apparatus as recited in claim 10, wherein said housing further includes a second drain in fluid communication with an area outside said chamber.

13. The apparatus as recited in claim 12, wherein said first drain includes a filtering element.

14. The apparatus as recited in claim 13, wherein said hinged door is actuated for opening and closing.

15. The apparatus as recited in claim 14, wherein when said hinged door is in the closed position filtrate will drain from said first filtering element into said first drain.

16. The apparatus as recited in claim 15, wherein when said hinged door is in the closed position, said filtrate will drain from said area outside said second filtering element into said second drain.

17. The apparatus as recited in claim 10, wherein said first filtering element is a perforated shaft.

18. The apparatus as recited in claim 10, wherein said first air valve is a rotating air valve.

19. The apparatus as recited in claim 10, wherein said first and second flights extend the vertical length of said first filtering element.

\* \* \* \* \*